H. E. IVES.
APPARATUS FOR AND METHOD OF TESTING VISUAL ACUITY.
APPLICATION FILED DEC. 14, 1916.
1,270,830.
Patented July 2, 1918.
3 SHEETS—SHEET 1.
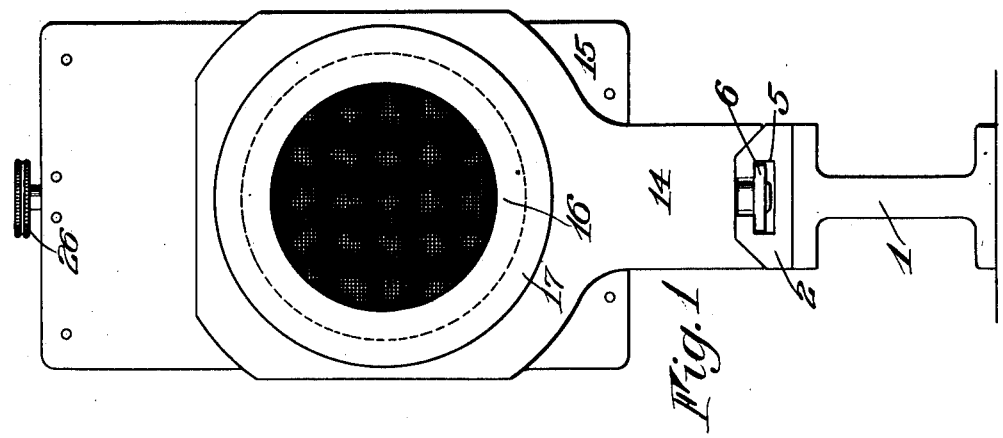
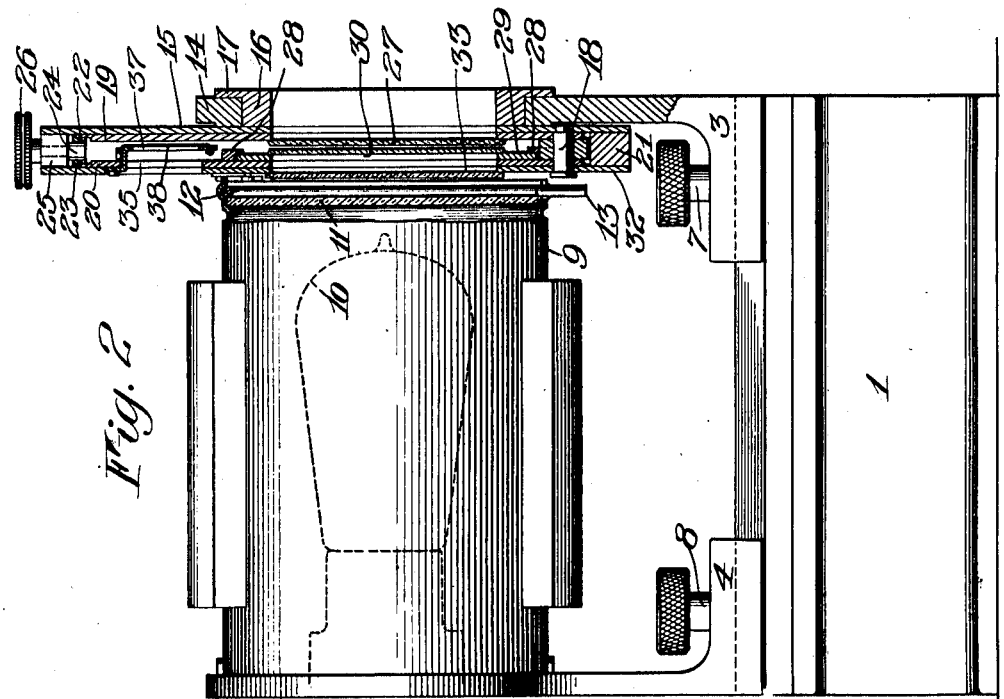
INVENTOR
Herbert E. Ives
BY
his ATTORNEYS H. E. IVES.
APPARATUS FOR AND METHOD OF TESTING VISUAL ACUITY.
APPLICATION FILED DEC. 14, 1916.
1,270,830. Patented July 2, 1918.
3 SHEETS—SHEET 2.
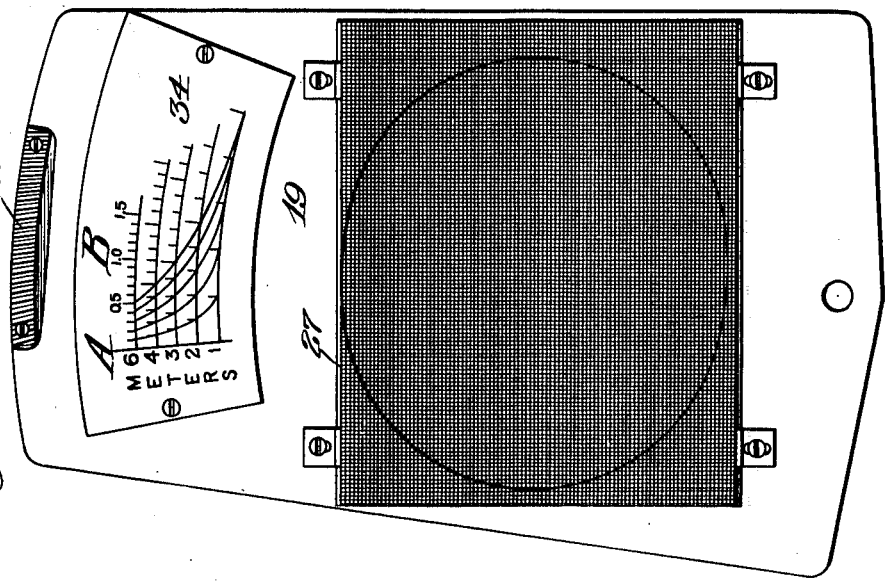
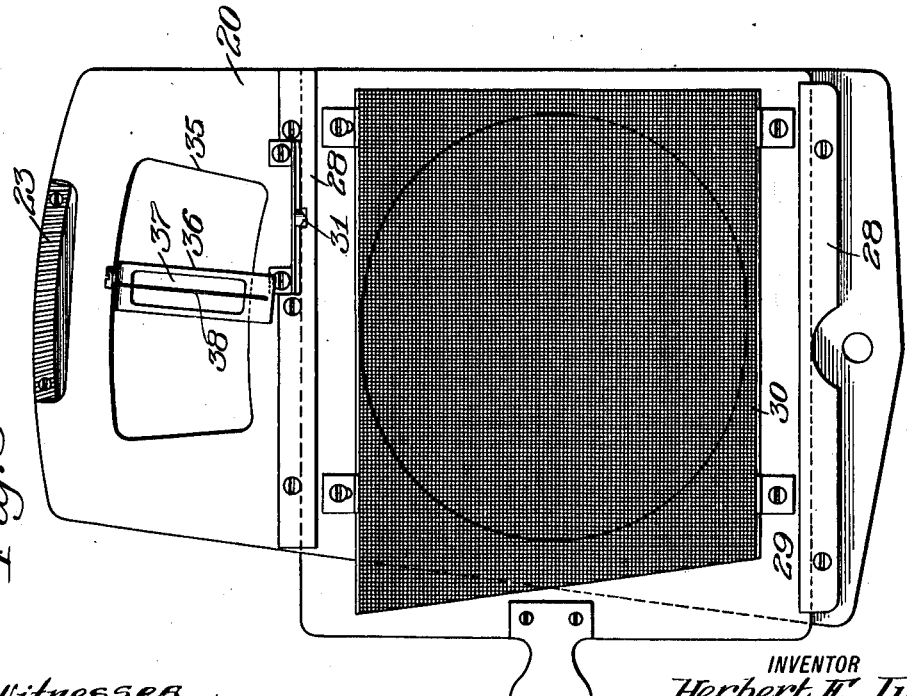

H. E. IVES.
APPARATUS FOR AND METHOD OF TESTING VISUAL ACUITY.
APPLICATION FILED DEC. 14, 1916.
1,270,830.
Patented July 2, 1918.
*Fig. 5*
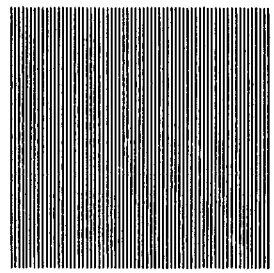
*Fig. 6*
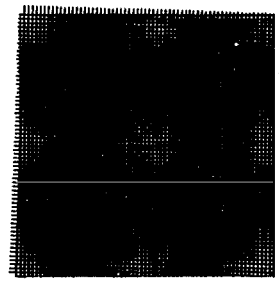
*Fig. 7*
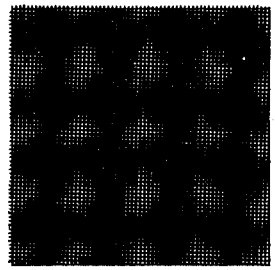
*Fig. 8*
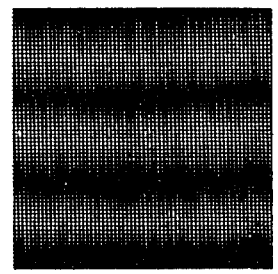
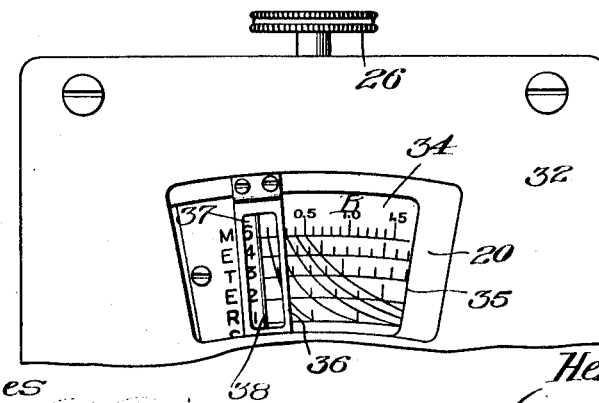
*Fig. 9*
INVENTOR
Herbert E. Ives
BY
his ATTORNEYS
Witnesses

UNITED STATES PATENT OFFICE.

HERBERT E. IVES, OF PHILADELPHIA, PENNSYLVANIA, ASSIGNOR TO BAUSCH & LOMB OPTICAL COMPANY, OF ROCHESTER, NEW YORK, A CORPORATION OF NEW YORK.

APPARATUS FOR AND METHOD OF TESTING VISUAL ACUITY.

1,270,830.                    Specification of Letters Patent.         Patented July 2, 1918.

Application filed December 14, 1916.   Serial No. 136,897.

*To all whom it may concern:*

Be it known that I, HERBERT E. IVES, of Philadelphia, county of Philadelphia, and State of Pennsylvania, have invented certain new and useful Improvements in Apparatus for and Methods of Testing Visual Acuity; and I do hereby declare the following to be a full, clear, and exact description of the same, reference being had to the accompanying drawings, forming a part of this specification, and to the reference-numerals marked thereon.

My present invention relates to apparatus for and methods used in testing human eyesight and it has for its object to provide a novel method of determining the power of human eyes and a suitable apparatus for making the test, consisting generally in forming a target, at a fixed and known distance from the patient, which is composed of alternate dark bands and light areas, and which may be gradually enlarged or diminished to change the size of the test figure until the limit of the resolving power of the eye or eyes is reached. A further object of my invention is to provide a test object comprising means for forming within a given area, by means of the interference phenomenon, a plurality of intersecting bands and symmetrically varying the spaces between them and also to mount the devices used for producing the object for rotary movement so that said lines may be positioned in any meridian desired when an eye is being tested for astigmatism. To these and other ends the invention consists in certain improvements and combinations of parts all as will be hereinafter more fully described, the novel features being pointed out in the claims at the end of the specification.

In the drawings:

Figure 1 is a front elevation of an apparatus showing one embodiment of my present invention;

Fig. 2 is a vertical longitudinal section thereof;

Figs. 3 and 4 are plan views of the adjustable plates carrying the coöperating gratings, or screens;

Fig. 5 is a detail plan view of a single ruled grating, or screen, which may be substituted for the one shown in Fig. 4;

Figs. 6 and 7 are views illustrating the figures, or patterns, produced by the combination of the two gratings shown in Figs. 3 and 4 in different positions of adjustment.

Fig. 8 is a view illustrating the interference bands created by the combined use of one of the double ruled gratings and the single ruled grating shown in Fig. 5;

Fig. 9 is an enlarged view of the scale employed for indicating the units of visual acuity.

Similar reference numerals throughout the figures indicate similar parts.

A test object, or figure, which is intended to be used by oculists, or optometrists, in testing human eyesight should have two dimensions, that is, they should extend both horizontally and vertically in order to test the resolving power of the eye in different meridians, and for practical purposes the square affords the best form of objects, and in order to produce it over a target of given area and effect the changes thereof by gradually increasing or diminishing the size of the figure, without the use of an optical lens system or substitution of different cards which attract the attention of the patient and prevent his expressing an unbiased opinion as to the clearness with which the object is observed by him, I make use of the interference phenomenon obtained by superposing two grating, or screens, such as shown in Figs. 3 and 4, having parallel cross-lines ruled thereon in two directions, preferably at right angles to each other. These gratings are made of transparent, or translucent material, preferably glass, on which the ruled lines are rendered opaque so as to provide alternate transparent lines and spaces of equal width. The thickness of the lines and the distance by which they are separated is such that at the distance from which they are to be observed by the patient, they cannot be seen separately by the eye, and the whole surface, therefore, appears in a neutral gray tint. For instance, if the working, or observing, distance is to be five meters a separation of line centers of one-fifth of a millimeter is adequate.

These two gratings, or screens, are superposed, as shown in Fig. 2, with their ruled surfaces separated only sufficiently to prevent friction between them and supported for rotation with respect to each other. The superposition and relative rotation of the gratings will cause the two sets of ruled lines on one of them to intersect the corresponding lines of the other, one or more times, and the interference produced by the intersection of said lines produces a series of bands, or dark opaque lines, extending across the area of the target. When the gratings are moved relatively by rotating one slightly in front of the other, or moving both of them in opposite directions, the bands will appear as shown in Fig. 6 and as the angle becomes more apparent the number of bands rapidly increases, as shown in Fig. 7, so that the graduation is in the first instance from a large figure, or a few large figures on the target, to a large number of smaller figures, the number of which can be increased to the point where the patient's eye is unable to resolve a constituent figure, and between these extremes the size and number of the figures may be adjusted until a figure of proper area is obtained. By measuring, in a given case, such figure, or measuring the distance between the lines composing it, the degree of visual acuity of the patient's eye may be obtained.

The use of the double ruled gratings, as shown in Figs. 3 and 4, possess an especial advantage in testing for visual acuity in that it produces a figure of two dimensions, the size of which can be gradually changed while observed by the patient.

When the degree of visual acuity is being determined it is frequently desirable to test a patient's eye for astigmatic errors, and for the purposes of this test I employ in combination with one of the double line gratings a single ruled grating, as illustrated in Fig. 5, the lines of which coöperate with one of the sets of lines of the former, and by crossing them will cause a diffraction phenomenon, producing what appears to be parallel opaque lines of which there may be one or more, as shown in Fig. 8. When this combination of gratings is employed the operator will adjust the screens so that the parallel bands produced are separated the same distance as those composing the squares, or parallelograms, previously selected by the patient as indicating the figure which he is able to see more or less distinctly. The parallel bands extending across the target should then appear with satisfactory clearness to the patient when the operator, by simultaneously rotating the screens adjust them to the axis of the cylindrical defect of the eye of the patient. This angularity of adjustment of the instrument is spoken of as the angular position with reference to the meridian, or equator, the former being a vertical plane and the latter a horizontal plane, and the degree of this adjustment may be measured and used to indicate the position of the axis of the cylinder lens required for the correction of such astigmatic error.

The apparatus shown in the drawing illustrates one embodiment of my invention and comprises a base 1, provided along its upper edge with a guide-rail 2, upon which are mounted the end pieces, or heads 3 and 4 and having a central T-shaped slot 5 receiving the heads 6 of the clamping members 7 and 8 by means of which said heads are removably secured in adjustable positions. The rear head 4 carries a cylindrical casing 9 containing the illuminating device, which preferably comprises an incandescent lamp 10. At the front of the casing is a translucent opal, or white, glass window 11 which modifies, or blends, the light rays to give the entire area of the window equal illumination. This glass is held removably in place by the spring wire loop 12 the ends of which are bent upwardly to form convenient handles, or gripping portions, as indicated by 13.

At the forward end of the machine the head carries a vertically extending wall-piece 14 provided with a central aperture which defines the area of the target and is in direct alinement with the window 11. In rear of the wall is a revoluble supporting plate 15 on which the adjustable members carrying the gratings, or screens, are mounted. The carrying plate 15 has on its forward side a hub 16 journaled in the aperture of the wall 14 with which it is held in engagement by means of the collar 17 embracing the face of the wall. At the bottom of the plate 15 and extending rearwardly therefrom is a stud, or post 18, on which the forward and rear plates 19 and 20, carrying the gratings, are pivoted, said plates at their lower ends being separated by the spacing member 21, and their upper ends being provided with the curved racks 22 and 23, which engage opposite sides of the adjusting pinion 24. The latter is journaled in a bearing member, or block, 25 rigidly mounted in the upper end of the plate 15 and is provided with a knurled nut 26 by means of which it may be rotated. Both the plates 19 and 20 are provided with elliptical apertures of such length that when adjusted to the limit of their movement in either direction they will not lessen the area, or field, of the instrument formed by the aperture of the wall 14.

The screens, or gratings, are carried on the plates 19 and 20 and one of them, indicated by 27 in Fig. 4, is permanently attached to the plate 19. In order to render the other screen easily removable the plate 20 is provided above and below its central aperture with parallel guide-rails 28, which receive the transversely removable slide 29 carrying the screen, or grating 30, which, it will be understood, may be either a single ruled grating, as shown in Fig. 5, or one that is provided with the double lined rulings. In the upper guide-rail 28 is inserted a spring operated finger 31 which presses against the edge of the frame 29 and preferably coöperates with a shallow notch therein to hold it in the proper position of adjustment. In rear of all of these parts is a covering plate 32 carrying a shade, ground glass disk 33, which is preferably tinted in order to produce approximately the effect of daylight and to soften the light rays impinging upon the screens in front of it so that they will harmonize, so to speak, with the opaque lines in the grating, or screen, and render the entire area of the target a uniform neutral gray color.

In an instrument of this character in order to obtain an unbiased opinion from a patient, whose eyes are undergoing examination, it is desirable to keep from him all knowledge regarding the extent of movement or adjustment of the screen plates and, therefore, I provide the indicating scale and its coöperating index in a position in rear of the front plate 15, and in order to provide a convenient and simple arrangement of these parts I form the graduations, indicating units of visual acuity, on a scale plate 34, which is mounted on the upper end of the rear face of the plate 19. In the plate 20, in an area opposite the scale, I provide an aperture 35 and extending thereacross is an inset spring plate 36 having a slot 37 across which is a fine wire 38 which lies closely in engagement with the scale on the face of the plate 34 and serves as an indicator, or pointer, coöperating with the various graduations when the plates 19 and 20 carrying the gratings are rotated.

In Fig. 9 I have shown an enlarged view of the scale which I have devised for use in conjunction with an instrument of this character whereby a direct reading may be had, giving units of visual acuity, according to any desired form of test that may be adopted. The common unit which is most generally used by refractionists is that known as the "Snellen", which calls for the separation of details of objects separated by two minutes of arc. The visual acuity test objects heretofore commonly used consisting of rows of letters and figures possesses certain inherent imperfections which have prevented the use of the "Snellen" unit to its fullest extent. For instance, the visual acuity charts contain only objects of certain sizes which must be read at a given distance in order to determine the measure of visual acuity. Consequently, if a person's vision falls between two of these fixed distances the actual acuity could not be determined. Visual acuity can and does have values lying at all points between the fixed points to which the present charts used for this purpose are for practical reasons, restricted. Further, by use of the old methods, calling for the expression of acuity in fractions formed by the quotient of the actual reading distance, clumsy fractions such as 6/20 or 5/12 are obtained, which are now avoided by the use of the scale I have illustrated, which permits the acuity to be read directly in "Snellen" units, or any decimal thereof varying continuously in value instead of in large steps obtained by the use of the ordinary test charts.

The scale proper consists of a series of circular arcs described from the center of rotation of the gratings (the stud 18 on which the plates 19 and 20 are journaled). At one end of each of these arcs is a numeral indicating the reading, or observing distance, preferably expressed in meters, such as 1, 2, 3, 4 or 6. The various distance graduations preferably increase in value and uniformly from the center of the area in both directions. The center point, or zero, on the scale is indicated by A and is the position occupied by the index wire 38 when the plates 19 and 20 are adjusted so that no figure, or pattern, is formed in the field of the instrument, at which time the rulings on the two coöperating gratings are parallel. The position on each arc indicating a "Snellen" unit is shown by B, and when the index wire 38 engages therewith the figure formed by the interference phenomenon of the two scales is of such size that the figure just subtends two minutes of arc at the reading distance indicated. The distance between zero (indicated by A) and "unity" (indicated by B) may be divided into any desired number of equal parts, preferably ten spaces and the same spaces may be extended beyond the unit point if desired. Such a scale indicates directly in decimal fractions in "Snellen" units the visual acuity of the observer, who can just perceive the pattern at a distance of either 1, 2, 3, 4, or 6 meters. The circular arc from which the reading is taken depends upon the size of the room or other factor determining the convenience of the operator when placing the patient.

An especial advantage is found in the use of an instrument embodying my present invention in that a test figure is obtained that is illuminated with absolute uniformity over the entire field and over the entire range of figures which may be formed by the phenomenon explained, and it is well known that the intensity and uniformity of the light is an important feature in eye testing to determine visual acuity.

I claim as my invention:

1. A test object for determining visual acuity comprising means for producing symmetrical patterns within a given area, said means comprising two sets of straight lines, one set extending at right angles to those of the other, and means for varying the size and number of the patterns and preserving their symmetry.

2. A visual acuity test object comprising a plurality of superposed gratings each having parallel sets of lines ruled thereon in two directions, means for rotating one grating relatively to the other to cause its dual sets of lines to intersect the corresponding lines of the other grating one or more times.

3. In an apparatus for testing eyes, the combination with means for producing a pattern comprising a plurality of lines, means for varying the size of the pattern by varying the relative relation of the lines, and a support carrying said pattern producing means adapted to be revolved to adjust the pattern when formed into different angular positions to the meridian.

4. In an apparatus for testing eyes, the combination with a plurality of cross-lined gratings, independent supports for each, revoluble about a common axis to produce a pattern by interference phenomenon, and means for adjusting said supports about the axis to vary the angular position of the pattern relatively to the meridian.

5. An apparatus for testing eyes comprising a support having an aperture, two independently adjustable members journaled thereon, a grating mounted on one of the members provided with equi-distant lines ruled in one direction and a grating carried on the other member composed of two sets of lines ruled thereon at right angles to each other and means for moving said members carrying the gratings relatively to each other to cause the lines on one to intersect those of the other at various angles.

6. An apparatus for testing eyes comprising a support having an aperture and two plates pivoted on the support and capable of rotation in opposite directions, a grating carried by one of said plates having equidistantly spaced lines ruled at right angles to each other and a separate grating mounted in the other plate having lines thereon ruled in one direction, said last mentioned grating being removably mounted on its supporting plate.

7. An apparatus for testing eyes, comprising an outer plate having an aperture and supported for axial rotation about the center of the aperture, two apertured plates pivoted on the outer plate, means carried on the outer plate for turning them in opposite directions, substantially transparent supports carried on said pivoted plates each having opaque lines ruled thereon at right angles to each other.

8. An eyetesting apparatus comprising an apertured support, a plate having an aperture coincident with that of the support and journaled for rotary movement about the axis of the apertures, two carrying members disposed one behind the other and each provided with an aperture in alinement with the first mentioned apertures, means supporting the carrying members for adjustment in directions transversely of the axis of the apertures and ruled gratings covering the openings in said carrying members.

9. An eyetesting apparatus comprising a frame, a supporting plate journaled thereon and two laterally adjustable plates pivotally mounted on the supporting plates, said frame and plates being provided with alined openings, guides on one of the adjustable plates, coöperating gratings formed of substantially transparent plates having opaque lines thereon, one grating being removably supported on said guides of one of the plates and the other fixed on the other adjustable plate.

10. An eyetesting apparatus comprising a vertically extending frame piece provided with an aperture, a plate supported in rear thereof for rotation about the axis of the aperture, two adjustable supporting plates, a pivot on the first mentioned plate extending through the two last mentioned plates, an adjustable member on the first mentioned plate coöperating with the two supporting plates to tilt them transversely in opposite directions, gratings composed of substantially transparent plates having opaque lines thereon mounted on said supporting plates and a source of illumination in alinement with the gratings.

11. In an apparatus for testing eyes, the combination with a support, two apertured plates spaced apart and pivoted at points beneath the apertures and having gear racks located above the latter, a pinion carried by the support and coöperating with said racks, and two gratings covering the apertures in the plates and carried thereby.

12. In an apparatus for testing eyes, the combination with a support, two spaced apertured plates in rear of the support and pivoted thereon and means for effecting relative movement of the plates, of coöperating gratings carried by the two plates, a scale carried by one of the plates and a coöperating index carried by the other plate, said scale and index being so disposed as to be invisible from a view point in front of the support.

13. In an apparatus for testing eyes, the combination with a support, two superposed plates pivoted on the rear side of the support and having registering target apertures and the rearmost plate having a second scale viewing aperture, and means for effecting relative movement of the plates, of coöperating gratings carried by the two plates, a scale mounted on the rear face of the forward plate in front of the viewing aperture of the rear plate and a coöperating index member carried by the latter.

14. In an eyetesting apparatus, the combination with a frame, a housing journaled thereon composed of front and rear apertured walls, and two apertured plates located between them and pivoted to the housing, of means for adjusting the plates on their pivot, coöperating gratings carried by the two plates and a source of illumination located to direct light rays through the housing.

15. In an eyetesting apparatus, the combination with a frame, a housing journaled thereon composed of front and rear apertured walls, and two apertured plates located between them, and a pivot point on the housing extending through the plates near one edge, of means on the housing engaging the plates near their opposite edges for adjusting them on their pivot, coöperating gratings carried by the two plates, a source of illumination directing light rays through the gratings and a shade toning the light rays located between the gratings and said light source.

16. In an eye testing apparatus, the combination with a base having upwardly extending front and rear frame pieces, a lamp hood mounted on the rear frame piece having an opening adjacent the front frame piece, a housing journaled on the latter comprising front and rear plates provided with apertures in alinement with the opening in the hood and a translucent light toning shade located between the hood and housing, of two opaque line gratings arranged one in front of the other within the housing and covering the aperture therein and means for rotating one grating relatively to the other.

17. In a visual acuity eyetesting apparatus, the combination with two superposed and pivotally mounted opaque line gratings, of an index member mounted to move with one of the gratings, a scale member mounted to move with the other grating comprising a row of indices lying in the path of the index member indicating fractional divisions of Snellen acuity units for a given distance of observation.

18. In a visual acuity eyetesting apparatus, the combination with two superposed and pivotally mounted opaque line gratings, of an index member mounted to move with one of the gratings, a scale member mounted to move with the other grating, a plurality of rows of indices lying in the path of the index member and indicating fractional divisions of Snellen acuity units, said indication in each row being differently spaced for corresponding distances of observation.

19. A method for testing eyes consisting in rotating, at a predetermined distance from the eye to be tested, superposed gratings each cross-lined in two directions to produce a plurality of squares by the interference phenomenon which creates intersecting dark bands and inclosed light areas, which are increased or diminished until the limit of resolution of the eye being tested is obtained and maintaining a uniform illumination throughout the entire range of the phenomenon.

20. A method for testing eyes consisting in forming within a target of given area, by means of the interference phenomenon produced by superposing two cross-lined gratings ruled in opposite directions, squares formed by alternate dark bands and light areas, increasing and diminishing the width of the bands and the area of the spaces until the limit of resolution of the eye being tested is obtained and maintaining the area of said spaces uniformly illuminated.

21. In an apparatus for testing eyes, the combination with a support, a plurality of gratings on said support, and means for moving said gratings relatively to each other to produce interference phenomenon.

22. In an apparatus for testing eyes, the combination with a support, a plurality of gratings on said support, means for moving said gratings relatively to each other, and means for indicating in Snellen acuity units the extent of said relative movement.

23. In an apparatus for testing eyes, the combination with a support, a plurality of gratings on said support, and means for adjusting said gratings about an axis to vary the angular position relatively to the meridian.

HERBERT E. IVES.